(12) United States Patent
El-Khamy et al.

(10) Patent No.: US 10,032,067 B2
(45) Date of Patent: Jul. 24, 2018

(54) SYSTEM AND METHOD FOR A UNIFIED ARCHITECTURE MULTI-TASK DEEP LEARNING MACHINE FOR OBJECT RECOGNITION

(71) Applicant: Samsung Electronics Co., Ltd., Suwon-si, Gyeonggi-do (KR)

(72) Inventors: Mostafa El-Khamy, San Diego, CA (US); Arvind Yedla, La Jolla, CA (US); Marcel Nassar, San Diego, CA (US); Jungwon Lee, San Diego, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 15/224,487

(22) Filed: Jul. 29, 2016

(65) Prior Publication Data

US 2017/0344808 A1     Nov. 30, 2017

Related U.S. Application Data

(60) Provisional application No. 62/342,945, filed on May 28, 2016.

(51) Int. Cl.
*G06K 9/00* (2006.01)
*G06T 7/00* (2017.01)

(52) U.S. Cl.
CPC .......... *G06K 9/00268* (2013.01); *G06T 7/004* (2013.01); *G06T 2207/20081* (2013.01);
(Continued)

(58) Field of Classification Search
CPC .............................. G06K 9/00268; G06T 7/004
See application file for complete search history.

(56) References Cited

U.S. PATENT DOCUMENTS 8,582,807 B2   11/2013  Yang et al.
2015/0347819 A1  12/2015  Yin et al.
(Continued)

FOREIGN PATENT DOCUMENTS

WO    2015078018 A1    6/2015

*Primary Examiner* — Ruiping Li
(74) *Attorney, Agent, or Firm* — Renaissance IP Law Group LLP (57) ABSTRACT

A system to recognize objects in an image includes an object detection network outputs a first hierarchical-calculated feature for a detected object. A face alignment regression network determines a regression loss for alignment parameters based on the first hierarchical-calculated feature. A detection box regression network determines a regression loss for detected boxes based on the first hierarchical-calculated feature. The object detection network further includes a weighted loss generator to generate a weighted loss for the first hierarchical-calculated feature, the regression loss for the alignment parameters and the regression loss of the detected boxes. A backpropagator backpropagates the generated weighted loss. A grouping network forms, based on the first hierarchical-calculated feature, the regression loss for the alignment parameters and the bounding box regression loss, at least one of a box grouping, an alignment parameter grouping, and a non-maximum suppression of the alignment parameters and the detected boxes.

22 Claims, 4 Drawing Sheets

(52) U.S. Cl.
CPC ............... *G06T 2207/20084* (2013.01); *G06T 2207/30201* (2013.01)

(56) References Cited

U.S. PATENT DOCUMENTS

2015/0347820 A1    12/2015  Yin et al.
2016/0379044 A1*  12/2016  Tang .................. G06K 9/00288
                                                   382/118

\* cited by examiner

SYSTEM AND METHOD FOR A UNIFIED ARCHITECTURE MULTI-TASK DEEP LEARNING MACHINE FOR OBJECT RECOGNITION

CROSS-REFERENCE TO RELATED APPLICATION

This patent application claims the priority benefit under 35 U.S.C. § 119(e) of U.S. Provisional Patent Application No. 62/342,945, filed on May 28, 2016, the disclosure of which is incorporated herein by reference in its entirety.

TECHNICAL FIELD

The subject matter disclosed herein generally relates to object recognition, and more particularly, to a system and a method for a unified architecture multi-task deep learning machine for object recognition.

BACKGROUND

Face detection and face verification have been conventionally performed using series operations, that is, tasks performed sequentially, in which separate algorithms are required to be trained for each task. Conventional approaches also require non-neural network techniques to perform face cropping and alignment between the tasks of face detection and face verification, thereby resulting in significant latency and using significant computing power and memory resources for the different networks.

SUMMARY

An example embodiment provides a system to recognize objects in an image in which the system may include an object detection network to detect an object in an input image in which the object detection network may include a first hierarchical convolutional neural network to output a first hierarchical-calculated feature for the detected object; a face alignment regression network to determine a regression loss for alignment parameters based on the first hierarchical-calculated feature for the detected object; and a detection box regression network to determine a regression loss for detected boxes based on the first hierarchical-calculated feature for the detected object, in which the object detection network may further include a weighted loss generator to generate a weighted loss for the first hierarchical-calculated feature for the detected object, the regression loss for the alignment parameters and the regression loss of the detected boxes; a backpropagator to backpropagate the generated weighted loss; and a grouping network to form, based on the first hierarchical-calculated feature for the detected object, the regression loss for the alignment parameters and the bounding box regression loss, at least one of a box grouping, an alignment parameter grouping, and a non-maximum suppression of the alignment parameters and the detected boxes.

An example embodiment provides a method to recognize objects in an image in which the method may include outputting a first hierarchical-calculated feature for an object detected in an input image; determining a regression loss for alignment parameters based on the first hierarchical-calculated feature for the detected object; determining a regression loss for detected boxes based on the first hierarchical-calculated feature for the detected object; generating a weighted loss for the first hierarchical-calculated feature for the detected object, the regression loss for the alignment parameters and the regression loss of the detected boxes; backpropagating the weighted loss; and forming, based on the first hierarchical-calculated feature for the detected object, the regression loss for the alignment parameters and the bounding box regression loss, at least one box grouping, an alignment parameter grouping, and a non-maximum suppression of the alignment parameters and the detected bounding boxes.

BRIEF DESCRIPTION OF THE DRAWINGS

In the following section, the aspects of the subject matter disclosed herein will be described with reference to exemplary embodiments illustrated in the figures, in which.

DETAILED DESCRIPTION

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein.

Reference throughout this specification to "one embodiment" or "an embodiment" means that a particular feature, structure, or characteristic described in connection with the embodiment is included in at least one embodiment disclosed herein. Thus, the appearances of the phrases "in one embodiment" or "in an embodiment" or "according to one embodiment" (or other phrases having similar import) in various places throughout this specification are not necessarily all referring to the same embodiment. As used herein, the word "exemplary" means "serving as an example, instance, or illustration." Any embodiment described herein as "exemplary" is not to be construed as necessarily preferred or advantageous over other embodiments. Furthermore, the particular features, structures, or characteristics may be combined in any suitable manner in one or more embodiments. Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement the teachings of particular embodiments disclosed herein.

The subject matter disclosed herein relates to a system and a method for a unified deep-learning machine that can learn and perform multiple tasks that are conventionally performed in series for face and/or object recognition. Conventionally, separate computing machines have been used serially for the tasks of object detection, object classification, face detection, face alignment, face identification, and face verification or face identification without leveraging similar computations that may be shared by the different tasks. Conventional approaches have thereby resulted in a significant operational latency, as well as using a significant amount of computation hardware resources and with a corresponding significant power consumption in comparison to the subject matter disclosed herein.

The subject matter disclosed herein provides that the tasks performed by a unified deep-learning machine may be tasks that may be disjoint, but are integral to each other or are part of a larger task. Accordingly, the subject matter disclosed herein allows multiple single-task machines to share resources with other different single-task deep learning machines configured as a multi-task deep-learning machines. For example, both a face detection network and a face verification network use the same hierarchical-calculated features from an input image. By incorporating different tasks to be part of a larger, integral task, similar computations may be leveraged and computational resources may be shared. In one embodiment, the face detection network may also include a proposed region or a set of regions of interest that indicate a location in an input image operated by the face alignment network and the face verification network. The subject matter disclosed herein also trains intelligent deep neural network machines on different tasks concurrently, thereby unifying several machines into one machine so that resources and computations may be shared, and saving hardware area and reducing power consumption.

Additionally, whereas deep-learning machines are conventionally designed to run on computer servers, the subject matter disclosed herein makes deep-learning machines feasible to run on-chip because many of the hardware resources are shared and because power consumption is reduced. Further, multiple level hierarchical classifications may be integrated in the same unified architectural framework, thereby increasing computational speed and freeing hardware resources.

Figure 1:
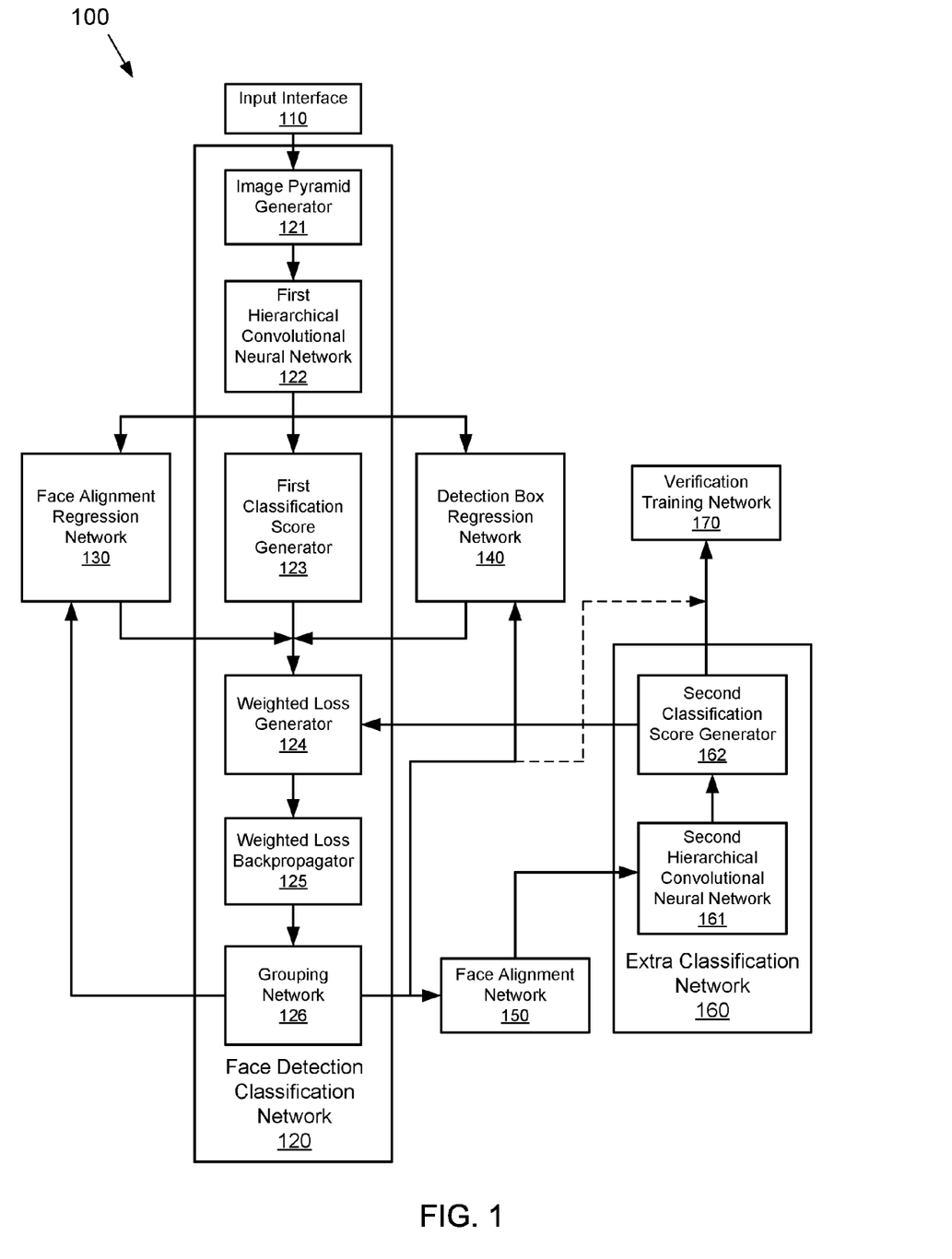
FIG. 1 depicts an embodiment of a system for face recognition according to the subject matter disclosed herein.

FIG. 1 depicts an embodiment of a system 100 for face recognition according to the subject matter disclosed herein. In one embodiment, the system 100 includes a unified architecture, multi-task deep-learning machine. Each of the respective blocks of the system 100 depicted in FIG. 1 may represent a component and/or a module of a system, or alternatively, an operation in a method. As used herein, the term "module" refers to any combination of software, firmware and/or hardware configured to provide the functionality described herein in connection with a module. The software may be embodied as a software package, code and/or instruction set or instructions, and the term "hardware," as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-chip (SoC) and so forth.

As depicted in FIG. 1, the system 100 includes an input interface 110, a face detection classification network 120, a face alignment regression network 130, a detection box regression network 140, a face alignment network 150, an extra classification network 160, and a face verification network 170. Although the system 100 in FIG. 1 has been depicted herein as being for face recognition by including a face detection classification network 120, it should be understood that the system 100 may be configured for object recognition as an alternative or in addition to being configured for face recognition.

In one embodiment, the face detection classification network 120 may be trained jointly with the face alignment regression network 130 and/or the detection box regression network 140 in which the cost function is a weighted sum of the classification accuracy and the sum of Euclidean distances from the trained keypoints and estimated keypoints. That is, the face detection classification network 120 may be jointly trained with the face detection regression network 130 and/or the box detection regression network 140 using shared convolutional layers. In one embodiment, the face alignment regression network 130 may use the features calculated for the face classification, and may operate on the regions that are highly probable to contain detection boxes.

Referring to FIG. 1, the input interface 110 may receive a single input image. In one embodiment, the single input image may be scaled by the input interface 110 to generate multiple scaled input images each having a different scale so that objects, such as, but not limited to, faces, may be detected at different distances in the input image.

The output of the input interface 110 may be coupled to an input of the face detection classification network 120. In one embodiment, the face detection classification network 120 may be a fully convolutional neural network (CNN) that produces hierarchical convolutional features of the input image. The hierarchical convolutional features may be pixel-wise probabilities that form a feature map, or a heat map, of likelihoods that a given pixel is part of one or more objects of interest. If there is only one object of interest, such as a face, the output feature map of likelihoods is a two-dimensional (2D) feature map that reflects the probability that the region belongs to the face of interest. This may be extended to generate multiple object classifications for multiple objects or regions of interest by having each corresponding subregion of feature maps at the output represent the probabilities that corresponding subregion may belong to each respective class in a classification domain.

Different sliding windows having multiple scales and/or aspect ratios may be scanned on the feature maps to determine the probability and box estimate for each region of interest. Multiple scales of input images may be input into the convolutional neural network to provide detections at the multiple scales followed by a box regression operation. Sliding windows of different scales may be used as disclosed herein to further refine the feature map generation process. Furthermore, the sliding windows may be generalized to have an arbitrary shape that may be tailored for a particular object of interest.

In one embodiment, the face detection classification network 120 includes an optional image pyramid generator 121, a first hierarchical convolutional neural network (HCNN) 122, a first classification score generator 123, a weighted loss generator 124, a weighted loss backpropagator 125, and a grouping network 126.

In one embodiment, the optional image pyramid generator 121 receives the input image from input interface 110 and generates image pyramids for the input image. If multiple scaled images have been generated by the input interface 110, the image pyramid generator 121 generates an image pyramid for each of the scaled images. In another embodiment, the image pyramid generator 121 may scale the input image to generate multiple scaled input images each having a different scale so that objects, such as, but not limited to faces, may be detected at different distances in the input image.

The first HCNN 122 receives the input image either directly from the input interface 110 or from the optional image pyramid generator 121 (if present) and generates hierarchical convolutional features. In one embodiment, the first HCNN 122 includes at least two layers. If multiple scaled input images are received by the first HCNN 122, hierarchical convolutional features are generated for each respective scaled image. If image pyramids have been generated by an image pyramid generator 121, the first HCNN 122 generates hierarchical convolutional features for each of the image pyramids.

The hierarchical convolutional features are simultaneously output to the first classification score generator 123, the face alignment regression network 130, and the detection box regression network 140. The first classification score generator 123 determines a classification score for each of the hierarchical convolutional features generated for the input image or for a set of anchors associated with each of the hierarchical convolutional features having different shapes and scales.

The face alignment regression network 130 determines a regression loss for alignment parameters, such as, but not limited to, keypoints, tilt angle and/or affine transformation parameters, using the hierarchical convolutional features generated by the first HCNN 122. The regression loss may be trained to minimize a Euclidean distance based on the detected keypoints and the trained keypoints. The face alignment regression network 130 may only scan for the keypoints at the regions of interest, which may correspond to the feature regions at the last convolutional layer that provides a high response for each class in the multi-dimensional feature map. Alternatively, the regions of interest may be regions corresponding to anchors on the feature maps that provide a high response indicating a high object probability in this region. To guarantee training convergence, an embodiment of the network disclosed herein that includes the keypoint estimation layers may be initially trained on images having a single object per image and accurately annotated. The face alignment regression network 130 may be fine-tuned on input images having arbitrary sizes. Multiple keypoint detections of the same object may be addressed by treating the keypoints as different classes, posing a loss function to minimize a classification problem by assigning scores to each keypoint, and combining keypoints of the same class.

In the context of face recognition, the keypoints may represent eyes, nose, left mouth corner, right mouse corner, and other facial points that are more representative of a face than just a box surrounding a face. Such keypoints convey information as the scale of the face, as well as the tilt angle of the face, and the profile of the face (as frontal or side profile). A side profile of a face is concluded if only a single eye can be classified with high probability. Other alignment parameters, such as a tilt angle, can also be learned according to the annotation of the training set.

In one embodiment, the face alignment regression network 130 may learn an affine transformation W directly in which elements of the affine transformation W may be calculated from the training set and the network may be trained to find the elements of W. The alignment with W may be achieved by another fully connected layer that represents the transformation with the affine function W that in turn represents the two-dimensional warping transformation of a region of interest. A key to multiscale operations may be that the cost function for alignment regression may be a weighted average of the Euclidean distance between aligned parameters as well as their classification score, thereby allowing a non-maximum suppression to be applied on the keypoints detected at multiple scales, as well as eliminating keypoints that have low classification scores.

Alternatively, an alignment parameter regression layer may be applied only on the feature map regions corresponding to regions after non-maximum suppression of detection boxes at different scales. In an embodiment, the alignment layer may be applied to only patches of the feature maps that corresponds to the regions of interest. The training procedure may depend on the annotations of the test set. If keypoint or detection box annotations exist for both aligned and non-aligned images, the alignment layer may be added after the keypoint regression layer has been trained, and then the network is fine-tuned end-to-end to learn the affine transformations. In another embodiment, both the keypoint regression layer and the alignment layer are trained simultaneously in which the full network may be trained end-to-end by back propagating the gradients of the alignment layer to the key point regression layer that are, in turn, back propagated to the feature map calculation layers used for object classification.

In one embodiment, the detection box regression network 140 determines a regression loss for bounding box parameters using the hierarchical convolutional features generated by the first HCNN 122. The detection box regression network 140 may treat box corners as four keypoints that are to be trained in a manner that the face alignment regression network 130 treats keypoints that are to be trained. The detection box regression network 140 may also be fine-tuned on input images having arbitrary sizes by addressing the multiple scales as keypoints of different classes and posing a loss function to minimize a classification problem by assigning scores to each keypoint.

The first classification score generator 123, the face alignment regression network 130 and the detection box regression network 140 operate concurrently on the output of the first HCNN 122.

The respective outputs generated by the face alignment regression network 130, the first classification score generator 123, and the detection box regression network 140 are concurrently input to the weighted loss generator 124 of the face detection classification network 120. The weighed loss generator 124 uses the three outputs from the face alignment regression network 130, the first classification score generator 123, and the detection box regression network 140 to determine a weighted loss of the output of the face alignment regression network 130, a weighted loss of the output of the first classification score generator 123, and a weighted loss of the output of the detection box regression network 140.

In one embodiment, a multi-task loss function that may be used to train the regression networks may be as follows. Let i denote the index of an anchor in a mini-batch of training data, $\pi_i^{(l)}$ and $b_i^{(l)}$ respectively denote the corresponding probability mass function over level-l classes and their bounding box coordinates, and $\theta^{(l)}$ represents all the parameters at level-l that are estimated by $\hat{\theta}^{(l)}$, such as alignment and affine transformation parameters. Then, the training loss function at level-l can be expressed as a weighted sum of multiple loss functions, as the classification loss function, the localization loss function, and the alignment regression loss functions. The contribution of each of the different loss functions is governed by hyper parameters $\lambda$ and $\gamma$, as below:

$$\mathcal{L}_l(\{\pi_i^{(l)}\}_i, \{b_i^{(l)}\}_i) = \Sigma_i \mathcal{L}_{cls}(\pi_i^{(l)}, u_i^{(l)}) + \lambda_l \mathcal{L}_{loc}(b_{i,u_i^{(l)}}^{(l)}, v_i^{(l)}) + \gamma_l \mathcal{L}_{reg}(\hat{\theta}_i^{(l)}, \theta^{(l)}) \quad (1)$$

in which $u_i^{(l)}$ denotes the ground truth class at level l and $v_i^{(l)}$ denotes the bounding box coordinates of the corresponding truth. At level-0, $u_i^{(0)}$ might, for example, indicate object/no-object, while at level-1 and level-2, $u_i^{(0)}$ might respectively be a second class classification, such car brand. The first term $\mathcal{L}_{cls}$ to the right of the equal sign in Equation 1 indicates the classification loss, which is usually provided by the softmax loss given by $\mathcal{L}_{cls}(p,x) = -\log p_x$, for a probability mass function p of x. The second loss term $\mathcal{L}_{loc}$ to the right of the equal sign in Equation 1 indicates the bounding box regression loss, and is a function of the true box coordinates and the box coordinates predicted for the true class. The localization error $\mathcal{L}_{loc}$ is typically given by the robust smoothed $L_1$-norm on each of the coordinates or the sum of Euclidean distances between the coordinates. The last parameter loss $\mathcal{L}_{reg}$ of Equation 1 represents the error between the learned and true parameters of additional components, such as alignment parameters, and is typically given by the $L_2$ loss. Alternatively, this loss function may represent a weighted average of the classification score and the distance metric from the corresponding keypoint. With this alternative approach, keypoints having small classification weights may be considered outliers and, therefore, eliminated.

The weighted loss of the output of the face alignment regression network 130, the weighted loss of the output of the first classification score generator 123, and the weighted loss of the output of the detection box regression network 140 are backpropagated by the weighted loss backpropagator 125. In another embodiment, the classification scores at single hierarchy (level) may be used for backpropagation in some form of multistage training or, alternatively, only a subset of the multiple hierarchies may be used in backpropagation combined with multistage training in which loss from only first two levels may be used at a first stage of training (i.e., summation is over i={1,2} only at first stage). For example, at a first stage the classification score at the first level may correctly identify an object (i.e., car, person, background), and at a second level may further classify the object class into a brand, and model (i.e., a car into a Ford Mustang and a person into a male or a female). Further, hierarchies may further classify the car as red Ford Mustang 2002, and person into name or unknown.

The grouping network 126 uses the backpropagated weighted losses and performs alignment parameter grouping, box grouping, and non-maximum suppression (NMS) of alignment parameters and detected boxes. The alignment parameter groups and the non-maximum suppression of the alignment parameters and the detected boxes are input to the face alignment regression network 130 to be used to fine-tune the output of the face alignment regression network 130. The box grouping output from the grouping network 126 is input to detection box regression loss network 140 for fine-tuning the regression loss generated by the detection box regression loss network 140. Additionally, keypoints from different feature patches, different scales or different proposed regions may be further combined using clustering or non-maximum suppression. This is important because for multiscaled non-aligned images, the classification score may represent how well the "eye" keypoint in the non-aligned non-scaled image region corresponds to the aligned "eye" keypoint in the training set and thereby allows for non-maximum suppression. For more involved alignment, such as frontalization, the alignment transformation may be applied to the image in a convolutional manner, but different transformations can be learned for different locations in the image. In such a situation, a different affine transformation may be learned and applied to different regions in the image and may be implemented using a sliding filter kernel having a specific stride that has different weights for each stride or set of strides.

In one embodiment, the output of the grouping network 126 may also be input directly to the verification training network 170. In another embodiment, the output of the grouping network 126 may be input to the face alignment network 150. The face alignment network 150 uses the output of the grouping network 126 to align a detected face.

The aligned detected face output from the face alignment network 150 may be input to the extra classification network 160. The extra classification network 160 may include an second hierarchical convolutional neural network (HCNN) 161 and a second classification score generator 162. The second HCNN 161 uses the aligned output regions to generate second hierarchical convolution features. The second classification score generator 162 generates a classification score on the next classification level hierarchy (e.g., a name for a face, a car brand, and a car model). The classification score generated by the second classification score generator 162 is output to the weighted loss generator 124 for fine-tuning the output of the weighted loss generator 124.

In one embodiment, multiple hierarchical classes may be addressed by a first classification network (i.e., the face detection classification network 120) that may classify an object as belonging to one of k classes. After alignment of the detected objects, each of these classes may be required to be further classified into $N_j$ sub-classes in which $N_j \gg k$. One example may include classifying both persons and cars in a first hierarchy of classes, followed by further identifying the name of a person and car model in a second hierarchy of classes. To share computation and resources, an embodiment disclosed herein may makes use of the features computed to classify the first hierarchy of classes because the features may have valuable information about the object of interest. More specifically, an embodiment of a network disclosed herein may make use of the further transformed features after alignment in which the transformation may be done by the alignment layer on the selected patches of the feature maps obtained by the first object classification network, and different patches of the final feature map may be subject to different transformations and affine transformations. More convolutional layers may be added to further compute more refined features on top of existing features. One embodiment of a network training for the new recognition layers may include training by freezing the network weights up to the proposed regions, box detections, keypoint regression and alignment layers, and only fine-tuning the extra layers. This ensures that the patch selection and the alignment layers have already converged to the correct alignment and object patch before further classification. In a second round of training after training the classification layer, the whole network may be fine-tuned end-to-end. The further-classification network may be formulated to have final fully connected layers that may be trained to maximize the likelihood metric or minimize cross-entropy loss. Such fully connected layers may later be replaced with dimension reduction and verification layers that may be trained to learn another affine transformation to reduce the dimension and discriminate against same or different classes. The training of the verification layer may be done by freezing the calculation of the further-classification networks, followed by end-to-end fine tuning of the whole network. In such a case, loss gradients may be back propagated from the dimension reduction and verification layers to the further-classification layers, the alignment layers, the keypoint regression layers, and higher level classification layers. At run-time, the output of the verification layer may provide features for further verification metric calculations or directly provide the likelihood of representing a specific class or a sub-class. The output of the second classification score generator 162 is also input to the face verification network 170 to train the network with discriminative metrics.

Figure 2:
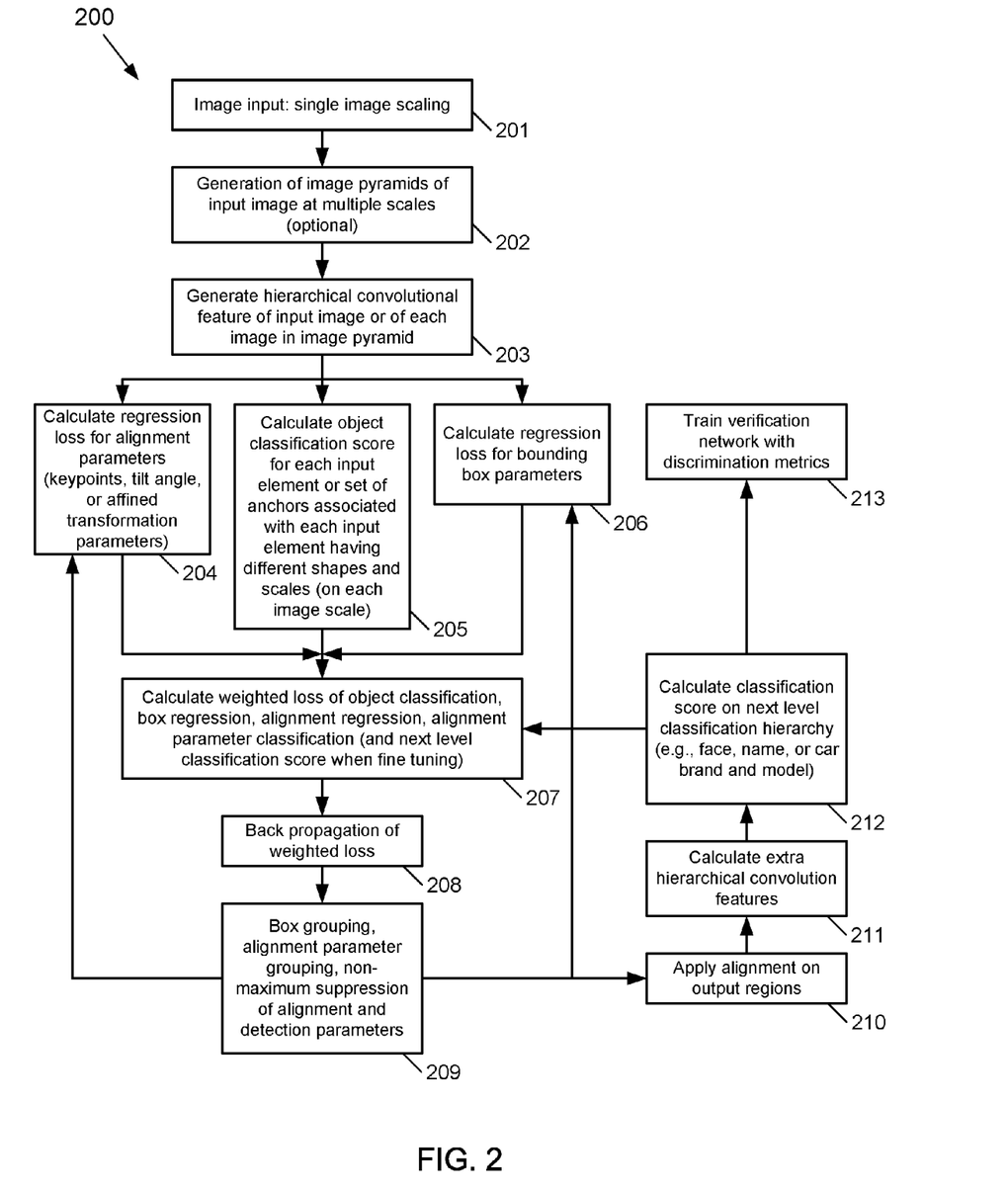
FIG. 2 depicts a flow diagram of an embodiment of a method for face recognition according to the subject matter disclosed herein.

FIG. 2 depicts a flow diagram of an embodiment of a method 200 for face recognition according to the subject matter disclosed herein. Although the method 200 in FIG. 2 will be described for face recognition, it should be understood that the method 200 may be arranged for object recognition as an alternative or in addition to being arranged for face recognition. It should also be understood that method 200 may be embodied as a computer-implemented method and/or may be embodied as a non-transitory computer-readable medium having stored thereon instructions that, if executed, result in at least the operations of method 200.

At 201, the present system receives a single input image. In one embodiment, the input image may be scaled to generate multiple scaled input images each having a different scale so that objects, such as, but not limited to faces, may be detected at different distances in the input image.

At 202, the present system generates an image pyramid from the input image. If multiple scaled images have been generated at operation 201, an image pyramid is generated for each of the scaled images. It is noted that 202 is optional, and the method 200 may proceed directly to 203 from 201 and bypass 202.

At 203, the present system generates hierarchical convolutional features. If image pyramids have been generated, hierarchical convolutional features are generated for each of the image pyramids. The method 200 proceeds simultaneously to 204, 205 and 206 from 203.

At 204, the present system determines a regression loss for alignment parameters based on the hierarchical convolutional features. At 205, the present system determines a classification score for each of the hierarchical convolutional features or for a set of anchors associated with each of the hierarchical convolutional features having different shapes and scales based on the hierarchical convolutional features. At 206, the present system determines a regression loss for bounding box parameters based on the hierarchical convolutional features. 204, 205 and 206 may be performed concurrently.

At 207, the present system determines a weighted loss of the output of the first classification score generator 123, a weighted loss of the output of the face alignment regression network 130, and a weighted loss of the output of the detection box regression network 140. At 208, the present system back propagates the weighted losses.

At 209, the present system groups the alignment parameters, groups the boxes, and performs a non-maximum suppression (NMS) of alignment parameters and detected boxes. The non-maximum suppression of the alignment parameters is used to fine-tune the regression loss for alignment parameters at 204. The non-maximum suppression of detected boxes is used to fine-tune the regression loss for the bounding box parameters.

The present system applies an alignment parameter grouping to the output regions of interest in the input image at 210. At 211, the present system determines extra hierarchical convolution features for the input image. At 212, the present system determines a classification score on a subsequent level classification hierarchy (i.e., a name of a face, or a car brand and model). The subsequent level classification score is used at 207 to fine-tune the weighted loss of object classification. At 213, the present system uses the subsequent level classification score to train a verification network using discriminative metrics.

Figure 3:
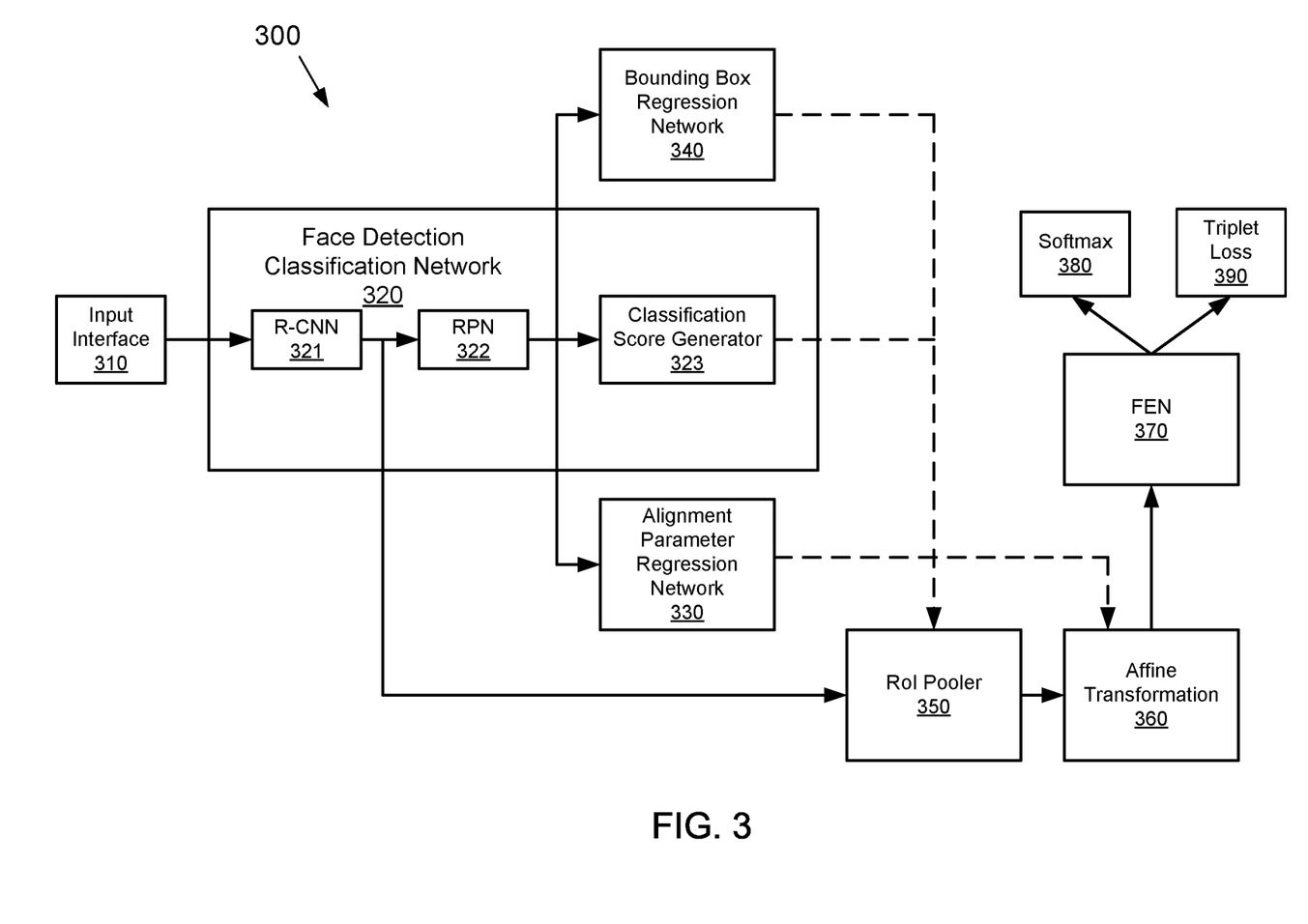
FIG. 3 depicts another embodiment of a system for face recognition according to the subject matter disclosed herein.

FIG. 3 depicts another embodiment of a system 300 for face recognition according to the subject matter disclosed herein. In one embodiment, the system 300 includes a unified architecture, multi-task deep-learning machine. Each of the respective blocks of the system 300 depicted in FIG. 3 may represent a component and/or a module of a system, or alternatively, an operation in a method. As depicted in FIG. 3, the system 300 may include an input interface 310, a face detection classification network 320, an alignment parameter regression network 330, a bounding box regression network 340, a Region of Interest (RoI) Pooler 350, an affine transformation network 360, a neural feature extraction network (FEN) 370. Although the system 300 in FIG. 3 has been characterized herein as being for face recognition by including a face classification network 320, it should be understood that the system 300 may be configured for object recognition as an alternative or in addition to being configured for face recognition.

The input interface 310 may receive a single input image. In one embodiment, the single input image may be scaled by the input interface 310 to generate multiple scaled input images each having a different scale so that objects, such as, but not limited to faces, may be detected at different distances in the input image similar to input interface 110 of system 100, shown in FIG. 1.

The output of the input interface 310 may be coupled to an input of the face detection classification network 320. In one embodiment, the face detection classification network 320 may include a CNN 321, a Region Proposal Network (RPN) 322, and a classification score generator 323. The output of the input interface 310 may be coupled to the input of the CNN 321. In this embodiment, no explicit alignment is necessary, although using aligned images at test time may improve performance. Additionally, in this embodiment, aspect ratios of 1:1 and 3:2 may be predicted as in the original RPN, and five (5) scales may be predicted. In one embodiment, the RPN 322 proposes candidate bounding boxes corresponding to the location of faces. In one embodiment, the RPN 322 may include alignment prediction. In one embodiment, the classification score generator 323 may determine whether a face is detected (i.e., face/no face). An output of the CNN 321 may be coupled to the RoI Pooler 350. An output of the RPN 322 may be concurrently coupled to the classification score generator 323, the alignment parameter regression network 330 and the bounding box regression generator 340. In one embodiment, the classification score generator 323 outputs a confidence score for each bounding box to determine whether the bounding box contains a face or not.

The alignment parameter regression network 330 may predict rotation (θ) and scale s using to fit a template of the aligned image at a certain scale. In one embodiment, the alignment parameter regression network 330 computes the scale, rotation and translation parameters for each bounding box. The bounding box regression network 340 may generate a bounding box regression. In one embodiment, the bounding-box regression network 340 updates the size and shape of the bounding boxes proposed by the RPN 322 for better localization.

The outputs of the classification score generator 323, and the bounding box regression generator 340 may be coupled to the RoI pooler 350, which may pool or group regions of interest. In one embodiment, the RoI Pooler 350 may extract the features contained in each bounding box. The output of the alignment parameter regression network 330 and the output of the RoI pooler 350 are coupled to the affine transformation network 360. In one embodiment, the affine transformation network 360 may perform alignment on feature maps instead on the original input image. For example, the affine transformation network 360 may perform the appropriate transformation (scale, rotation etc.) for the features in each bounding box. The affine transformation network 360 may perform an affine transformation that may be given by $$x' = s \begin{bmatrix} \cos\theta & -\sin\theta \\ \sin\theta & \cos\theta \end{bmatrix} x \quad (2)$$

Alternatively, the scale and rotation may be predicted as a similarity transformation, in which case the alignment transformation would be given by $$x' = sRx + t = \begin{bmatrix} a & -b \\ b & a \end{bmatrix} x + \begin{bmatrix} t_x \\ t_y \end{bmatrix}, \quad (3)$$

in which the parameters a, b, $t_x$ and $t_y$ may be computed using a least squares fit on the detected keypoints. The parameters a and b correspond to the scaled rotation parameters, and the $t_x$ and $t_y$ correspond to the translation parameters. In one embodiment, there may be different alignment parameters for different faces. In another embodiment for face frontalization as well as alignment, different alignment parameters are calculated for different locations of the same face in order to fit the desired frontal face template.

In one embodiment, the FEN 370 may be used to extract features from each bounding box. The softmax layer 380 may compute a probability distribution for each bounding box over the class of persons used for training. In one embodiment, the triplet loss 390 may ensure that the features of the bounding boxes belonging to the same person are "closer" to each other as opposed to features of bounding boxes that belong to different persons.

Figure 4:
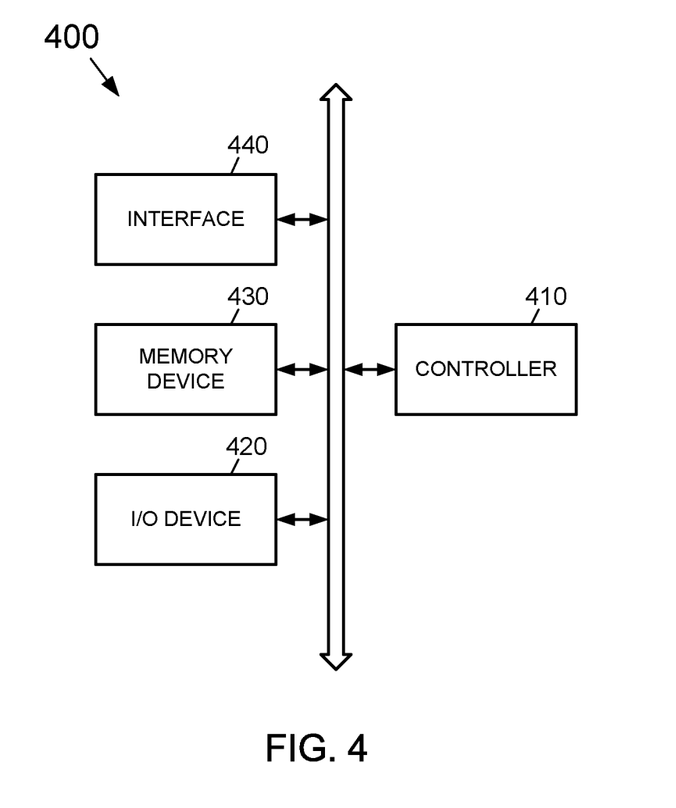
FIG. 4 depicts an electronic device that includes one or more integrated circuits (chips) including a system to recognize a face and/or an object in an image according to the subject matter disclosed herein.

FIG. 4 depicts an electronic device 400 that includes one or more integrated circuits (chips) having a system to recognize a face and/or an object in an image according to the subject matter disclosed herein. Electronic device 400 may be used in, but not limited to, a computing device, a personal digital assistant (PDA), a laptop computer, a mobile computer, a web tablet, a wireless phone, a cell phone, a smart phone, a digital music player, or a wireline or wireless electronic device. The electronic device 400 may include a controller 410, an input/output device 420 such as, but not limited to, a keypad, a keyboard, a display, or a touch-screen display, a memory 430, and a wireless interface 440 that are coupled to each other through a bus 450. The controller 410 may include, for example, at least one microprocessor, at least one digital signal process, at least one microcontroller, or the like. The memory 430 may be configured to store a command code to be used by the controller 410 or a user data. Electronic device 400 and the various system components include electronic device 400 may include a system to recognize a face and/or an object in an image according to the subject matter disclosed herein. The electronic device 400 may use a wireless interface 440 configured to transmit data to or receive data from a wireless communication network using a RF signal. The wireless interface 440 may include, for example, an antenna, a wireless transceiver and so on. The electronic system 400 may be used in a communication interface protocol of a communication system, such as, but not limited to, Code Division Multiple Access (CDMA), Global System for Mobile Communications (GSM), North American Digital Communications (NADC), Extended Time Division Multiple Access (E-TDMA), Wideband CDMA (WCDMA), CDMA2000, Wi-Fi, Municipal Wi-Fi (Muni Wi-Fi), Bluetooth, Digital Enhanced Cordless Telecommunications (DECT), Wireless Universal Serial Bus (Wireless USB), Fast low-latency access with seamless handoff Orthogonal Frequency Division Multiplexing (Flash-OFDM), IEEE 802.20, General Packet Radio Service (GPRS), iBurst, Wireless Broadband (WiBro), WiMAX, WiMAX-Advanced, Universal Mobile Telecommunication Service-Time Division Duplex (UMTS-TDD), High Speed Packet Access (HSPA), Evolution Data Optimized (EVDO), Long Term Evolution-Advanced (LTE-Advanced), Multi-channel Multipoint Distribution Service (MMDS), and so forth.

Figure 5:
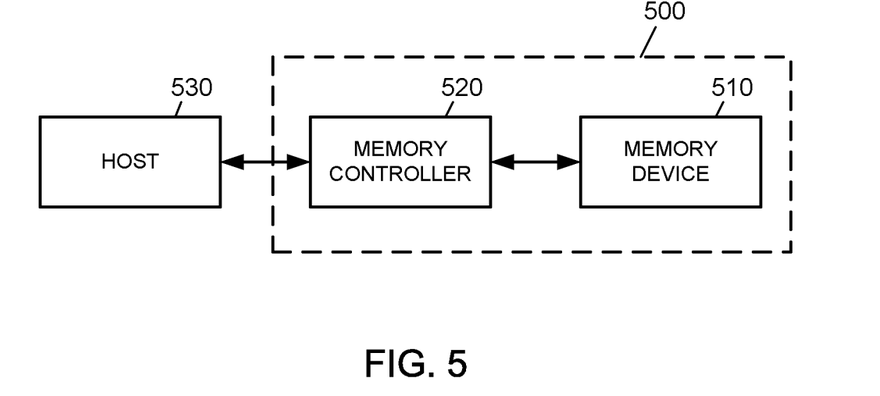
FIG. 5 depicts a memory system that may include a system to recognize a face and/or an object in an image according to the subject matter disclosed herein.

FIG. 5 depicts a memory system 500 that may include a system to recognize a face and/or an object in an image according to the subject matter disclosed herein. The memory system 500 may include a memory device 510 for storing large amounts of data and a memory controller 520. The memory controller 520 controls the memory device 510 to read data stored in the memory device 510 or to write data into the memory device 510 in response to a read/write request of a host 530. The memory controller 520 may include an address-mapping table for mapping an address provided from the host 530 (e.g., a mobile device or a computer system) into a physical address of the memory device 510. The memory device 510 may include one or more semiconductor devices including a system to recognize a face and/or an object in an image according to the subject matter disclosed herein.

As will be recognized by those skilled in the art, the innovative concepts described herein can be modified and varied over a wide range of applications. Accordingly, the scope of claimed subject matter should not be limited to any of the specific exemplary teachings discussed above, but is instead defined by the following claims.

What is claimed is:

1. A system to recognize objects in an image, the system comprising:
   an object detection network to detect an object in an input image, the object detection network comprising a first hierarchical convolutional neural network to output a first hierarchical-calculated feature for the detected object;

a face alignment regression network to determine a regression loss for alignment parameters based on the first hierarchical-calculated feature for the detected object, the alignment parameters being one or more of a keypoint, a tilt angle and an affine transformation parameter for the first hierarchical-calculated feature; and a detection box regression network to determine a regression loss for detected boxes based on the first hierarchical-calculated feature for the detected object, each detected box being a region of interest in the input image, wherein the object detection network further comprises:
a weighted loss generator to generate a multi-task loss function comprising a first weighted loss for the first hierarchical-calculated feature for the detected object, a second weighted loss for the regression loss for the alignment parameters for the first hierarchical-calculated feature for the detected object, and a third weighted loss for the regression loss of the detected boxes for the first hierarchical-calculated feature for the detected object;
a backpropagator to backpropagate the first weighted loss, the second weighted loss and the third weighed loss; and
a grouping network to form, based on the first hierarchical-calculated feature for the detected object, the regression loss for the alignment parameters and the bounding box regression loss, at least one of a box grouping, an alignment parameter grouping, and a non-maximum suppression of the alignment parameters and the detected boxes.

2. The system according to claim 1, wherein the object is a face.

3. The system according to claim 2, wherein the keypoint may represent an eye, a nose, a left mouth corner or a right mouth corner.

4. The system according to claim 1, wherein the object detection network comprises a convolutional neural network.

5. The system according to claim 1, wherein the weighted loss generator fine-tunes the regression loss for the alignment parameters based on the non-maximum suppression of the alignment parameters and the detected boxes.

6. The system according to claim 1, wherein the weighted loss generator fine-tunes the regression loss for the detected boxes based on the box grouping.

7. The system according to claim 1, further comprising:
a first classification score generator to receive the first hierarchical-calculated convolutional feature for the detected object, wherein the classification score generator determines a first classification score for an input element from the first hierarchical convolutional feature for the detected object.

8. The system according to claim 7, further comprising:
an aligner to apply the alignment parameter grouping to output regions of the input image;
a second hierarchical convolution neural network to generate a second hierarchical-calculated feature from the aligned output regions of the input image;
a second classification score generator to generate a subsequent level classification score of the object on a subsequent level classification hierarchy based on the second hierarchical-calculated feature from the aligned output regions of the input image; and
a verification network to be trained using the subsequent level classification score of the object.

9. The system according to claim 8, wherein two or more of the object detection network, the face alignment regression network, the detection box regression network, the aligner, the first classification score generator, the second hierarchical convolution neural network, the second classification score generator, and the verification network simultaneously provide one of more of joint training and joint sharing of calculations dynamically.

10. The system according to claim 1, wherein the hierarchical convolutional neural network further outputs a corresponding hierarchical-calculated features for each of the detected object in a plurality of input images, wherein the plurality of images are each scaled to a different size from the input image.

11. A method to recognize objects in an image, the method comprising:
outputting from a hierarchical convolutional network of an object detection network a first hierarchical-calculated feature for an object detected in an input image;
determining by a face alignment regression network a regression loss for alignment parameters based on the first hierarchical-calculated feature for the detected object, the alignment parameters being one or more of a keypoint, a tilt angle and an affine transformation parameter for the first hierarchical-calculated feature;
determining by a detection box regression network a regression loss for detected boxes based on the first hierarchical-calculated feature for the detected object, each detected box being a region of interest in the input image;
generating by a weighted loss generator a multi-task loss function comprising a first weighted loss for the first hierarchical-calculated feature for the detected object, a second weighted loss for the regression loss for the alignment parameters for the first hierarchical-calculated feature for the detected object, and third weighted loss for the regression loss of the detected boxes for the first hierarchical-calculated feature for the detected object;
backpropagating by a backpropagator the first weighted loss, the second weighted loss and the third weighted loss; and
forming by a grouping network, based on the first hierarchical-calculated feature for the detected object, the regression loss for the alignment parameters and the bounding box regression loss, at least one box grouping, an alignment parameter grouping, and a non-maximum suppression of the alignment parameters and the detected bounding boxes.

12. The method according to claim 11, wherein the object is a face.

13. The method according to claim 12, wherein the keypoint may represent an eye, a nose, a left mouth corner or a right mouth corner.

14. The method according to claim 11, wherein the object detection network comprises a convolutional neural network.

15. The method according to claim 11, further comprising fine-tuning the regression loss by the weighted loss generator for the alignment parameters based on the non-maximum suppression of the alignment parameters and the detected boxes.

16. The method according to claim 11, further comprising fine-tuning the regression loss by the weighted loss generator for the detected boxes based on the box grouping.

17. The method according to claim 11, further comprising:

receiving at a first classification score generator the first hierarchical-calculated feature for the detected object; and determining by the first classification score generator a first classification score for an input element from the first hierarchical-calculated feature for the detected object.

18. The method according to claim 17, further comprising:

applying by an aligner the alignment parameter grouping to output regions of the input image;

generating by a second hierarchical convolution network a second hierarchical-calculated feature from the aligned output regions of the input image;

generating by a second classification score generator a subsequent level classification score of the object on a subsequent level classification hierarchy based on the second hierarchical-calculated feature from the aligned output regions of the input image; and training by a verification network a verification network using the subsequent level classification score of the object.

19. The method according to claim 18, further comprising simultaneously providing one of more of joint training and joint sharing of calculations dynamically by two or more of the object detection network, the face alignment regression network, the detection box regression network, the aligner, the first classification score generator, the second hierarchical convolution neural network, the second classification score generator, and the verification network.

20. The method according to claim 11, further comprising outputting by the hierarchical convolutional neural network a corresponding hierarchical-calculated features for each of the detected object in a plurality of input images, wherein the plurality of images are each scaled to a different size from the input image.

21. The system of claim 1, wherein the multi-task loss function comprises:

$$\mathcal{L}_l(\{\pi_i^{(l)}\}_i, \{b_i^{(l)}\}_i) = \Sigma_i \mathcal{L}_{cls}(\pi_i^{(l)}, u_i^{(l)}) + \lambda_l \mathcal{L}_{loc}(b_{i,u_i}^{(l)}, v_i^{(l)}) + \gamma_l \mathcal{L}_{reg}(\hat{\theta}_i^{(l)}, \theta^{(l)})$$

in which i denotes an index of an anchor in a mini-batch of training data, $\pi_i^{(l)}$ and $b_i^{(l)}$ respectively denote the corresponding probability mass function over level-l classes and their bounding box coordinates, $\theta^{(l)}$ represents alignment and affine transformation parameters at level-l that are estimated by $\hat{\theta}^{(l)}$, $\lambda$ and $\gamma$ represent hyper parameters, $u_i^{(l)}$ denotes a ground truth class at level l, $v_i^{(l)}$ denotes bounding box coordinates of a corresponding truth, $\mathcal{L}^{cls}$ is the first weighted loss which is a classification loss that is provided by a softmax loss given by $\mathcal{L}_{cls}(p,x) = -\log p^x$ for a probability mass function p of x, $\mathcal{L}_{loc}$ is the third weighted loss which is a bounding box regression loss and is a function of true box coordinates and box coordinates predicted for a true class, and $\mathcal{L}_{reg}$ is the second weighted loss and represents an error between learned and true parameters of alignment parameters.

22. The method of claim 11, wherein the multi-task loss function comprises:

$$\mathcal{L}_l(\{\pi_i^{(l)}\}_i, \{b_i^{(l)}\}_i) = \Sigma_i \mathcal{L}_{cls}(\pi_i^{(l)}, u_i^{(l)}) + \lambda_l \mathcal{L}_{loc}(b_{i,u_i}^{(l)}, v_i^{(l)}) + \gamma_l \mathcal{L}_{reg}(\hat{\theta}_i^{(l)}, \theta^{(l)})$$

in which i denotes an index of an anchor in a mini-batch of training data, $\pi_i^{(l)}$ and $b_i^{(l)}$ respectively denote the corresponding probability mass function over level-l classes and their bounding box coordinates, $\theta^{(l)}$ represents alignment and affine transformation parameters at level-l that are estimated by $\hat{\theta}^{(l)}$, $\lambda$ and $\gamma$ represent hyper parameters, $u_i^{(l)}$ denotes a ground truth class at level l, $v_i^{(l)}$ denotes bounding box coordinates of a corresponding truth, $\mathcal{L}_{cls}$ is the first weighted loss which is a classification loss that is provided by a softmax loss given by $\mathcal{L}_{cls}(p,x) = -\log p_x$ for a probability mass function p of x, $\mathcal{L}_{loc}$ is the third weighted loss which is a bounding box regression loss and is a function of true box coordinates and box coordinates predicted for a true class, and $\mathcal{L}_{reg}$ is the second weighted loss and represents an error between learned and true parameters of alignment parameters.

* * * * *